(12) United States Patent
Nozaki

(10) Patent No.: US 6,574,170 B2
(45) Date of Patent: Jun. 3, 2003

(54) RECORDING MEDIUM REPRODUCTION APPARATUS

(75) Inventor: Koji Nozaki, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 180 days.

(21) Appl. No.: 09/887,441

(22) Filed: Jun. 25, 2001

(65) Prior Publication Data

US 2002/0009020 A1 Jan. 24, 2002

(30) Foreign Application Priority Data

Jul. 24, 2000 (JP) ...................................... 2000-222836

(51) Int. Cl.[7] .............................................. G11B 17/22
(52) U.S. Cl. .................. 369/30.24; 369/30.26
(58) Field of Search .................... 369/30.24, 30.26, 369/30.36, 30.1, 30.03, 30.01, 30.09; 360/7–8, 74.1; 386/46, 112, 52, 125, 68

(56) References Cited

U.S. PATENT DOCUMENTS 5,633,764 A * 5/1997 Ohta ............................ 360/7
5,859,815 A * 1/1999 Inoue et al. ............. 369/30.09

FOREIGN PATENT DOCUMENTS

JP 7-287893 10/1995

* cited by examiner

*Primary Examiner*—Ali Neyzari
(74) *Attorney, Agent, or Firm*—Morgan, Lewis & Bockius LLP

(57) ABSTRACT

When a disk reproduction apparatus 1 receives an input caused by the operation of "a fast-forwarding key" or "a rewinding key" during the reproduction operation, then the apparatus detects the number of successive operations of "the fast-forwarding key" or "the rewinding key" to thereby determine the fast-forwarding reproduction speed or the rewinding reproduction speed, and executes the fast-forwarding reproduction or the rewinding reproduction at the reproduction speed thus determined. Further, when the apparatus receives an input caused by the operation of "a normal fast-forwarding key" or "a normal rewinding key", the apparatus reads a normal fast-forwarding reproduction speed or a normal rewinding reproduction speed stored in a memory and executes the fast-forwarding reproduction or the normal rewinding reproduction at the reproduction speed thus read. Thus, the fast-forwarding reproduction and the normal rewinding reproduction at desired reproduction speeds can be executed easily.

5 Claims, 2 Drawing Sheets

| KIND | REPRODUCTION SPEED |
| --- | --- |
| FAST-FORWARDING REPRODUCTION | FOUR TIMES |
| REWINDING REPRODUCTION | EIGHT TIMES |

RECORDING MEDIUM REPRODUCTION APPARATUS

BACKGROUND OF THE INVENTION

1. Technical Field

The present invention relates to a recording medium reproduction apparatus which outputs a reproduction signal of information recorded in a recording medium, particularly, a disk-shaped recording medium such as a CD, a DVD, a MD etc.

2. Related Art

Conventionally, an apparatus for reading information recorded in a disk-shaped recording medium such as a CD, a DVD, a MD etc. and outputting a reproduced signal, that is, a so-called a disk apparatus has been put into practical use. A general disk apparatus having been put into practical use is provided with a high-speed reproduction function capable of reproducing at high speeds such as two-times, four-times, eight-times speeds etc. in addition to a normal reproduction speed. This high-speed reproduction function is utilized in such a case of finding a desired reproduction position while seeing a reproduced image, for example. Further, the apparatus is configured so as to be able to set a reproduction speed freely.

Incidentally, in the high-speed reproduction of a moving picture, the number of frames reproduced per a unit time is reduced as compared with the normal-speed reproduction. Further, the high-speed reproduction is performed for each of the fast-forwarding direction and the rewinding direction.

Problems to be Solved

However, the conventional disk apparatus is configured in a manner that the reproduction speed at the time of the high-speed reproduction is set in accordance with the number of the operations of a fast-forwarding key and the reproduction speed at the time of the rewinding reproduction is set in accordance with the number of the operations of a rewinding key. For example, in the disk apparatus capable of performing the high-speed reproduction at the two-times, four-times, eight-times speeds in addition to the normal speed reproduction, the high speed reproduction at the two-times reproduction speed is started when the fast-forwarding key is operated once upon reproduction, the high speed reproduction at the four-times reproduction speed is started when the fast-forwarding key is operated twice successively upon reproduction, and the high speed reproduction at the eight-times reproduction speed is started when the fast-forwarding key is operated tree-times successively upon reproduction. Thus, for a user who usually utilizes the high-speed reproduction at the eight-times reproduction speed, there arises a problem that the user is always required to operate the fast-forwarding key tree-times successively at the time of using the high-speed reproduction, so that the setting operation of the reproduction speed is troublesome.

As a technique for solving the aforesaid problem, there has been proposed a magnetic recording and reproducing apparatus (the Unexamined Japanese Patent Application Publication No. Hei7-287893) in which a reproduction speed at a high-speed reproduction is stored when the high-speed reproduction is utilized, then the reproduction speed utilized at the previous high-speed reproduction is read when a variable speed button is operated upon utilizing the high-speed reproduction next, and the high-speed reproduction is executed in accordance with the reproduction speed thus read. However, according to such an apparatus, if the high-speed reproduction is performed at a reproduction speed different from a reproduction speed usually utilized by a user, the user is required to perform the operation of changing the reproduction speed from the previously utilized speed to the usually utilizing speed when the user executes the high-speed reproduction at the usually utilizing reproduction speed. In this manner, according to the technique disclosed in the aforesaid publication, if the reproduction is executed at a reproduction speed different from the reproduction speed usually utilized, the reproduction speed having been set so as to utilize usually is changed, so that the operability is not improved sufficiently.

SUMMARY OF THE INVENTION

An object of the invention is to provide a recording medium reproduction apparatus in which setting operations of reproduction speeds upon a fast-forwarding reproduction and a rewinding reproduction are simplified.

Means for Solving the Problems

The recording medium reproduction apparatus according to the invention has the following configuration in order to solve the aforesaid problem.

(1) The recording medium reproduction apparatus includes:

a reading unit which reads information recorded in a recording medium;

a reproduction speed determining unit which determines a reproduction speed of the information read by the reading unit;

a reproduction signal generating unit which generates a reproduction signal at the reproduction speed determined by the reproduction speed determining unit;

a reproduction signal output unit which outputs the reproduction signal generated by the reproduction signal generating unit; and a reproduction speed storage unit which stores a reproduction speed set in advance, wherein the reproduction speed determining unit sets the reproduction speed stored in the reproduction speed storage unit as the reproduction speed when a first signal is inputted, and determines a reproduction speed based on an input pattern of a second signal when the second signal is inputted.

According to this configuration, the reproduction speed storage unit stores a reproduction speed at the time of a high-speed reproduction, and the reproduction signal is generated at the reproduction speed stored in the reproduction speed storage unit when the first signal is inputted. In contrast, when the second signal is inputted, the reproduction signal is generated at a reproduction speed which is determined based on the input pattern of the second signal, for example, the number of successive inputs of the second signals.

Thus, the operation at the time of executing the reproduction at the reproduction speed usually used can be performed simply. Further, even if the reproduction is executed at a reproduction speed not utilized usually, the reproduction speed set so as to utilize usually is not changed, so that the operability can be improved sufficiently.

(2) The reproduction speed determining unit determines a reproduction speed at a time of a fast-forwarding reproduction.

According to this configuration, the setting operation of the reproduction speed at the time of executing the fast-forwarding reproduction can be performed simply.

(3) The reproduction speed determining unit determines a reproduction speed at a time of a rewinding reproduction.

According to this configuration, the setting operation of the reproduction speed at the time of executing the rewinding reproduction can be performed simply.

(4) The reproduction speed storage unit has a storage area which stores a reproduction speed at a time of a fast-forwarding reproduction and a reproduction speed at a time of a rewinding reproduction, and the reproduction speed determining unit determines a reproduction speed at a time of a fast-forwarding reproduction and a reproduction speed at a time of a rewinding reproduction.

According to this configuration, the setting operations of the reproduction speeds at the time of executing the fast-forwarding reproduction and the rewinding reproduction can be performed simply.

(5) The reading unit reads information in a non-contact manner from a disk-shaped recording medium being rotated.

According to this configuration, information recorded in a disk-shaped recording medium such as a CD, a DVD, a MD etc. can be reproduced.

A block diagram showing the configuration of a disk reproduction apparatus according to an embodiment of the invention.

FIG. 2

A diagram showing the configuration of a memory for storing reproduction speeds utilized at the time of a fast-forwarding reproduction and a rewinding reproduction.

FIG. 3

A flow chart showing the operation of the disk apparatus according to the embodiment of the invention.

DETAILED DESCRIPTION OF THE PREFERRED EMBODIMENTS

Mode for Carrying Out the Invention

Figures 1, 2:
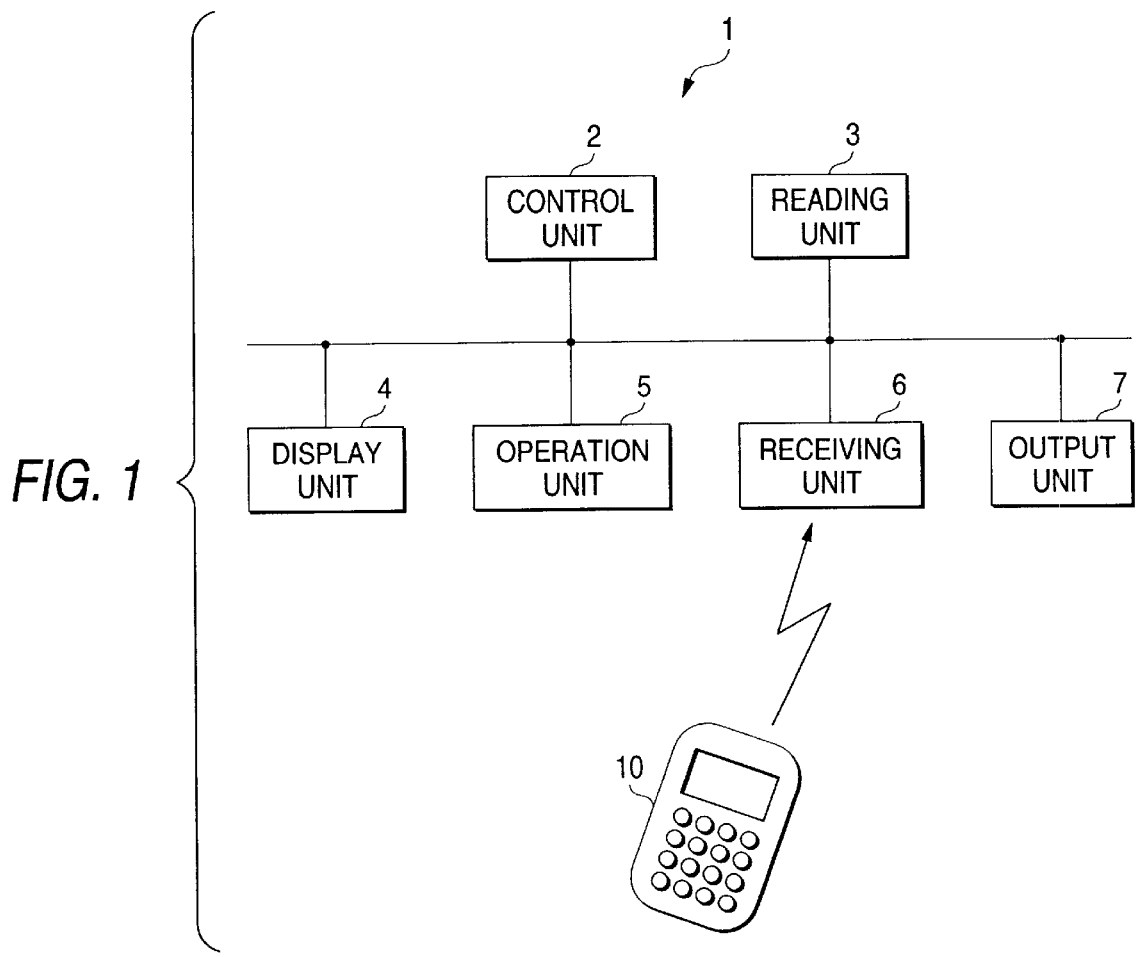
FIG. 1

FIG. 1 is a block diagram showing the configuration of a disk reproduction apparatus according to an embodiment of the invention. A disk reproduction apparatus 1 includes a control unit 2 for controlling the operation of a main body, a reading unit 3 having an optical pickup for reading in a non-contact manner information recorded in a disk (for example, a CD, a DVD, a MD) which is set in the main body and rotated, a display unit 4 for displaying the operation state etc. of the main body, an operation unit 5 for performing an input operation, a receiving unit 6 for receiving a control code transmitted from a remote control device 10 for remotely controlling the main body, and an output unit 7 for outputting a reproduction signal based on the information read from the disk. The disk reproduction apparatus 1 can execute the high-speed reproduction at one of the reproduction speeds of two-times, four-times and eight-times of a normal reproduction speed upon the fast-forwarding reproduction and the rewinding reproduction.

In each of the fast-forwarding reproduction and the rewinding reproduction, the number of frames reproduced per a unit time is reduced as compared with the normal-speed reproduction (that is, the frame data of the reproduction signal outputted from the disk reproduction apparatus 1 is skipped or thinned out). Further, in each of the fast-forwarding reproduction and the rewinding reproduction, audio data may not necessarily be outputted. However, when outputting the audio data, vowel portions may be shortened.

The control unit 2 is provided with a memory having a storage area for storing the reproduction speeds at the time of the fast-forwarding reproduction and the rewinding reproduction (see FIG. 2). A user can freely set the reproduction speed at the time of the fast-forwarding reproduction and the rewinding reproduction to one of the two-times, four-times and eight-times of the normal fast-forwarding and normal rewinding speeds, respectively. The reproduction speed at the time of the fast-forwarding reproduction and the rewinding reproduction can be set in the following manner. That is, the reproduction speed at the time of the fast-forwarding reproduction can be set in a manner that the operation mode of the main body is set to a parameter setting mode, then the reproduction speed at the time of the fast-forwarding reproduction is selected, and the reproduction speed (one of 2, 4 and 8) is inputted. Also, the reproduction speed at the time of the rewinding reproduction can be set in a manner that the operation mode of the main body is set to the parameter setting mode, then the reproduction speed at the time of the rewinding reproduction is selected, and the reproduction speed (one of 2, 4 and 8) is inputted.

In the disk reproduction apparatus 1 according to the embodiment, the main body can be operated through the inputting operation at the operation unit 5 or the remote control device 10.

Further, in the disk reproduction apparatus 1 according to the embodiment, each of the operation unit 5 and the remote control device 10 is provided with "a normal fast-forwarding key" and "a normal rewinding key" in addition to "a fast-forwarding key" and "a rewinding key" having been provided at the conventional apparatus. In the disk reproduction apparatus 1, when "the normal fast-forwarding key" is operated during the reproduction, the reproduction is executed at the normal fast-forwarding reproduction speed stored in the memory shown in FIG. 2, whilst when "the normal rewinding key" is operated during the reproduction, the reproduction is executed at the normal rewinding reproduction speed stored in the memory shown in FIG. 2.

Figure 3:
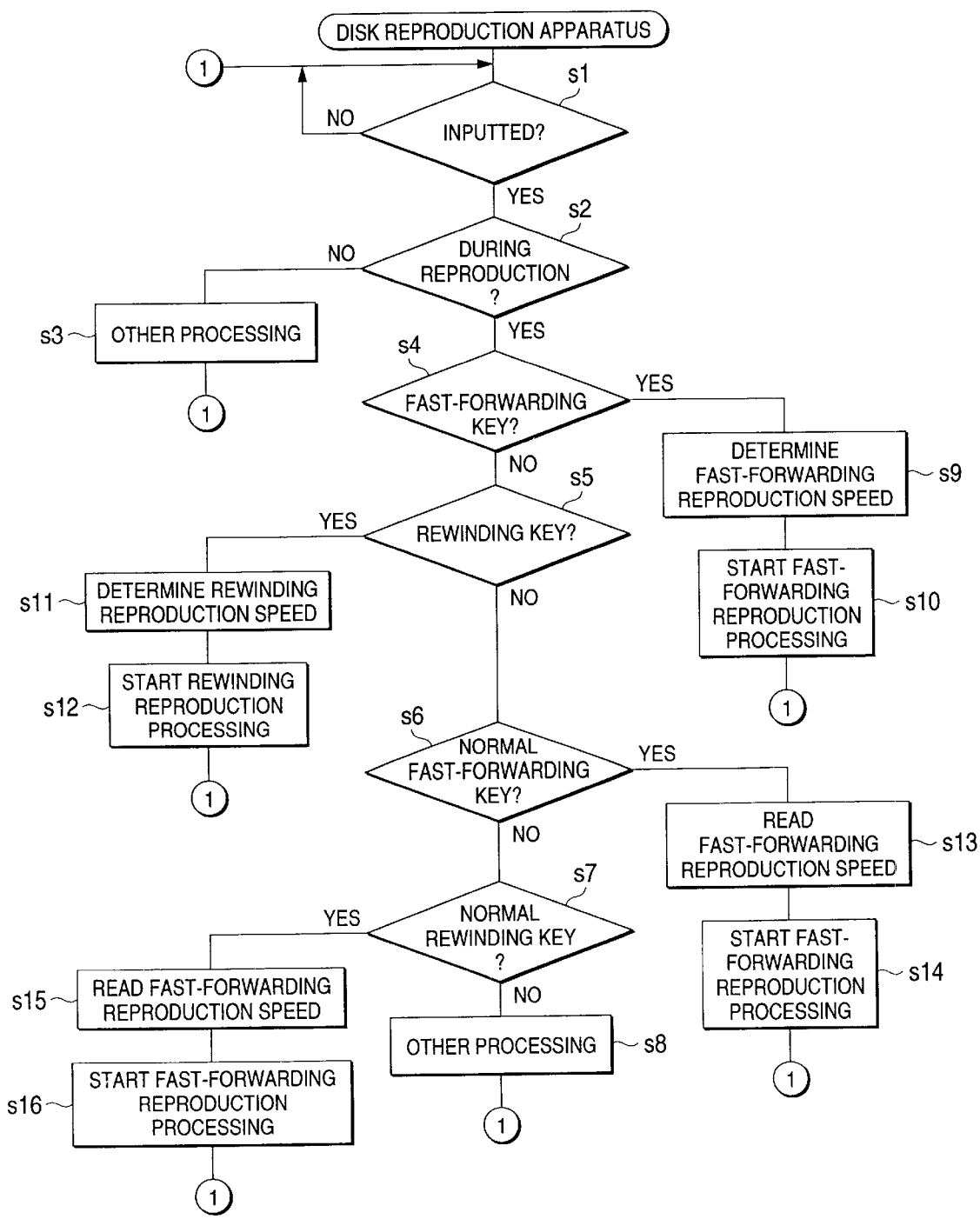

Hereinafter, the operation of the disk reproduction apparatus 1 according to the embodiment will be explained. FIG. 3 is a flow chart showing the operation of the disk apparatus according to the embodiment. The disk reproduction apparatus 1 monitors whether an input is applied to the main body or not (s1) The input can be applied to the main body through the key operation of the operation unit 5 or the key operation of the remote control device 10. When the inputting operation is performed as to the remote control device 10, the remote control device transmits the control code accorded to this inputting operation to the main body of the apparatus by means of an infrared ray or radio wave. In the main body of the apparatus, the receiving unit 6 receives the control code thus transmitted from the remote control device 10.

The disk reproduction apparatus 1 determines whether the apparatus is during the reproduction operation when the input is applied to the main body (s2), then starts the processing accorded to the input when it is determined that the reproduction operation is not being performed (executes other processing) (s3), and the process returns to step s1. For example, when the main body receives an input instructing the ejection of a disk set in the main body, the apparatus executes the processing of ejecting the disk set in the main body. In contrast, when the main body receives an input instructing the starting of the reproduction, the apparatus starts the reproduction of the information recorded in the disk set in the main body.

When it is determined that the reproduction operation is being performed in step s2, it is determined whether the input to the main body is caused by one of the operations of "the fast-forwarding key", "the winding key", "the normal fast-forwarding key" and "the normal winding key" or not (s4 to s7). When the input to the main body is caused by the operation other than the operations of "the fast-forwarding key", "the winding key", "the normal fast-forwarding key" and "the normal winding key", the disk reproduction apparatus 1 starts the processing accorded to the input (executes other processing) (s8), and the process returns to step s1. For example, when the main body receives an input instructing the stoppage of the reproduction, the apparatus stops the reproduction of information recorded in the disk set in the main body and returns the process to step s1.

When the disk reproduction apparatus 1 determines in step s4 that the input to the main body is caused by the operation of the fast-forwarding key, the apparatus detects the number of successive operations of the fast-forwarding key to thereby determine the fast-forwarding reproduction speed (s9). In step s9, if the number of operation of the fast-forwarding key is one, the reproduction speed is determined at twice the normal reproduction speed. Further, if the number of successive operations of the fast-forwarding key is two, the reproduction speed is determined at four-times of the normal reproduction speed, whist if the number of successive operations of the fast-forwarding key is three, the reproduction speed is determined at eight-times of the normal reproduction speed. Then, the fast-forwarding operation at the reproduction speed determined in step s9 is started and then the process returns to step s1 (s10).

When the disk reproduction apparatus 1 determines in step s5 that the input to the main body is caused by the operation of the rewinding key, the apparatus detects the number of successive operations of the rewinding key to thereby determine the rewinding reproduction speed (s11). In step s11, if the number of operation of the rewinding key is one, the rewinding reproduction speed is determined at twice the normal rewinding reproduction speed. Further, if the number of successive operations of the rewinding key is two, the rewinding reproduction speed is determined at four-times of the normal rewinding reproduction speed, whist if the number of successive operations of the rewinding key is three, the rewinding reproduction speed is determined at eight-times of the normal rewinding reproduction speed. Then, the rewinding operation at the rewinding reproduction speed determined in step s11 is started and then the process returns to step s1 (s12).

When the disk reproduction apparatus 1 determines in step s6 that the input to the main body is caused by the operation of the normal fast-forwarding key, the apparatus reads the fast-forwarding reproduction speed stored in the memory shown in FIG. 2 and determines the reproduction speed at the fast-forwarding reproduction speed thus read (s13). Then, the apparatus starts the fast-forwarding operation at the reproduction speed determined in step s13 and returns the process to step s1 (s14).

Further, when the disk reproduction apparatus 1 determines in step s7 that the input to the main body is caused by the operation of the normal rewinding key, the apparatus reads the rewinding reproduction speed stored in the memory shown in FIG. 2 and determines the reproduction speed at the rewinding reproduction speed thus read (s15). Then, the apparatus starts the rewinding operation at the reproduction speed determined in step s15 and returns the process to step s1 (s16).

In this manner, according to the disk reproduction apparatus 1 of the embodiment, the fast-forwarding reproduction speed and the rewinding reproduction speed usually used by a user can be set in advance, and the fast-forwarding reproduction and the rewinding reproduction at the desired reproduction speed can be executed through the one-touch operations of "the normal fast-forwarding key" and "the normal rewinding key", respectively.

Further, like the conventional apparatus, the fast-forwarding reproduction and the rewinding reproduction at the reproduction speed not stored in the memory shown in FIG. 2, that is, at the reproduction speed not set in advance can be executed easily based on the operation pattern of "the fast-forwarding key" and "the rewinding key", respectively. In this case, since the fast-forwarding reproduction speed and the rewinding reproduction speed stored in the memory shown in FIG. 2 are not changed, the-fast-forwarding reproduction and the rewinding reproduction at the reproduction speeds usually used by a user (the fast-forwarding reproduction speed and the rewinding reproduction speed stored in the memory shown in FIG. 2) can be hereinafter performed through the one-touch operation of "the normal fast-forwarding key" and "the normal rewinding key", respectively.

Further, the fast-forwarding reproduction speed and the rewinding reproduction speed stored in the memory shown in FIG. 2 can be freely set and changed by a user in the parameter setting mode, as described above.

Furthermore, in the disk reproduction apparatus according to the embodiment, although the explanation was made that each of the fast-forwarding reproduction and the rewinding reproduction can be performed at one of the reproduction speeds of two-times, four-times and eight-times of the normal reproduction speed, the apparatus may be arranged in a manner that each of the fast-forwarding reproduction and the rewinding reproduction can be performed at one of other reproduction speeds, for example, three-times, five-times etc. of the normal reproduction speed.

Effects of the Invention

As described above, according to the invention, since the reproduction speeds usually used by a user can be set in advance at the fast-forwarding reproduction and the rewinding reproduction, the fast-forwarding reproduction and the rewinding reproduction can be performed easily at the reproduction speeds usually used by the user.

Further, the reproduction at the reproduction speeds not usually used by a user can be executed at the fast-forwarding reproduction and the rewinding reproduction, and in this case the reproduction speeds set in advance can not be changed.

What is claimed is:

1. A recording medium reproduction apparatus comprising:
    a reading unit which reads information recorded in a recording medium;
    a reproduction speed determining unit which determines a reproduction speed of the information read by said reading unit;
    a reproduction signal generating unit which generates a reproduction signal at the reproduction speed determined by said reproduction speed determining unit;
    a reproduction signal output unit which outputs the reproduction signal generated by said reproduction signal generating unit; and
    a reproduction speed storage unit which stores a reproduction speed set in advance, wherein
        said reproduction speed determining unit sets the reproduction speed stored in said reproduction speed storage unit as the reproduction speed when a first signal is inputted, and determines a reproduction speed based on an input pattern of a second signal when the second signal is inputted.

2. The recording medium reproduction apparatus according to claim 1, wherein
said reproduction speed determining unit determines a reproduction speed at a time of a fast-forwarding reproduction.

3. The recording medium reproduction apparatus according to claim 1, wherein
said reproduction speed determining unit determines a reproduction speed at a time of a rewinding reproduction.

4. The recording medium reproduction apparatus according to claim 1, wherein
said reproduction speed storage unit has a storage area which stores a reproduction speed at a time of a fast-forwarding reproduction and a reproduction speed at a time of a rewinding reproduction, and
said reproduction speed determining unit determines a reproduction speed at a time of a fast-forwarding reproduction and a reproduction speed at a time of a rewinding reproduction.

5. The recording medium reproduction apparatus according to claim 1, wherein
said reading unit reads information in a non-contact manner from a disk-shaped recording medium being rotated.

* * * * *